United States Patent
Ridnik et al.

(10) Patent No.: US 8,039,984 B2
(45) Date of Patent: Oct. 18, 2011

(54) SYSTEM FOR CONVERTING SOLAR RADIATION INTO ELECTRICITY

(75) Inventors: Refael Ridnik, Yahud (IL); Sharon Roded, Rehovot (IL)

(73) Assignee: Advanced Solar Power Israel Ltd., Tel Aviv (IL)

( * ) Notice: Subject to any disclaimer, the term of this patent is extended or adjusted under 35 U.S.C. 154(b) by 338 days.

(21) Appl. No.: 12/470,087

(22) Filed: May 21, 2009

(65) Prior Publication Data

US 2010/0295306 A1 Nov. 25, 2010

(51) Int. Cl.
*H02K 7/18* (2006.01)
*F01D 15/10* (2006.01)
*F03G 6/06* (2006.01)
*F24J 2/34* (2006.01)
*F24J 2/38* (2006.01)

(52) U.S. Cl. .............................. 290/52; 290/2
(58) Field of Classification Search .................. 290/1 A, 290/2, 52; 123/2, 3; 60/641.8–641.15
See application file for complete search history.

(56) References Cited

U.S. PATENT DOCUMENTS

2006/0260314 A1* 11/2006 Kincaid et al. ............... 60/641.8
2008/0289334 A1* 11/2008 Orosz et al. .................. 60/641.8

* cited by examiner

*Primary Examiner* — Quyen Leung
*Assistant Examiner* — Leda Pham
(74) *Attorney, Agent, or Firm* — Browdy and Neimark, PLLC

(57) ABSTRACT

A system is provided for converting thermal energy derived from a solar field into electricity. The system is adapted to operate in accordance with at least two modes of operation, depending upon the thermal energy intake, and comprises: a first power generation sub-system comprising means to heat water into superheated steam by exchanging heat with a first heat transfer fluid being heated at the solar radiation collecting field, and a back pressure turbine for producing electricity; a second power generation sub-system comprising means to heat a second working fluid, and the second working fluid is used to operate a second turbine for producing electricity; and wherein the system is characterized in that when the thermal energy received at the first power generation sub-system exceeds a predetermined threshold of a selected criterion, both power generation sub-systems are operative to produce electricity and at least part of the heat required to heat the second working fluid is derived from exhaust steam being produced at the first power generation sub-system, whereas when the thermal energy received at the first power generation sub-system does not exceed that threshold, the thermal energy conveyed by the first heat transfer fluid is used essentially to heat the second working fluid and the electricity is generated only by the second power generation sub-system.

7 Claims, 3 Drawing Sheets

SYSTEM FOR CONVERTING SOLAR RADIATION INTO ELECTRICITY

FIELD OF THE INVENTION

The present invention relates in general to the field of power generation and in particularly to power blocks for Concentrated Solar thermal Power (CSP).

BACKGROUND OF THE INVENTION

The current global framework, with growing oil price instability, limited oil and gas resources and the Kyoto Protocol environmental requirements, calls for continued improvements in the usage of renewable energy resources, including solar. During the last decades, interest in solar energy solutions has increased because the potential of solar energy has become apparent.

Even though solar radiation is a source of high temperature and energy at the origin, sun-earth geometrical constraints lead to a dramatic dilution of flux and to irradiance available for terrestrial of about 1 kW/m² and consequently, to a supply of low temperature to the thermal fluid. It is therefore essential requisite for solar thermal power plants to make use of optical concentration devices that enable the thermal conversion of high solar flux and with relatively little heat loss. Typical concentration devices for solar radiation are: parabolic troughs, linear Fresnel reflectors, parabolic dishes, and power tower (or central receiver solar systems—CRS). Solar thermal power based on such concentrators is called Concentrated Solar thermal Power (CSP). The most common solar thermal power systems are parabolic trough and power tower.

A parabolic trough power plant is basically composed of three main elements: the solar system, the steam generator and the power block. The solar system comprises parabolic trough collectors' field and the oil (i.e. heat transfer fluid) circuit. At the solar field, solar radiation is collected and converted into thermal energy as the temperature of the oil circulating through the receivers, increases. Once heated at the solar field, the oil is pumped and conveyed to a steam generator, to produce high pressure/temperature steam. The steam is then used to produce power similarly to conventional steam power plants (e.g. Rankine cycle).

In power towers (or CRS), incident sunrays are reflected from large mirror collectors (heliostats), which track the apparent sun movement and concentrate the energy flux onto a solar receiver, where energy is transferred to thermal fluid. This fluid can also be direct steam. The thermal energy conversion into electricity is quite similar to fossil-fueled power plants.

Both parabolic trough and CRS are proven technology. However, their cost is not yet competitive with conventional alternatives unless subsidized. Therefore, it is yet desired to improve the existing plants cost effectiveness.

U.S. Pat. No. 5,444,972 describes a hybrid power plant driven by hydrocarbon fuels and solar energy. The solar system is CRS and the power block is condensing steam cycle (Rankine). Exhaust gas of a turbine and fuel added burner backup the solar field in generating the steam. Sensible heat storage and a receiver thermal shield are described in this publication as being optional features.

GB 2449181 discloses a combined gas/steam (or Brayton/Rankine) hybrid power plant. The heat input to the gas cycle partially depends on solar heating of air supplied to an initial combustion stage from a compressor of the gas turbine engine. Simplification and/or greater responsiveness of the gas turbine engine's fuel control system is achieved by providing the power plant with separate combustion stages being coupled to an associated turbine. Compensation for variations in insolation is achieved by controlling fuel flow to the initial combustion stage while compensation for variations in electrical load is achieved by controlling fuel flow to a subsequent combustion stage. The final turbine stage drives a generator, and the exhaust from the final turbine stage is passed through a heat recovery steam generator to raise further power in a steam turbine that also drives a generator. The second combustion stage, including a superheater, may be located in the steam cycle part of the combined cycle to further heat the steam before entry to the steam turbine. Concentrated solar energy may heat a heat transfer fluid, e.g. a molten salt, for intermediate heat transfer and heat storage.

U.S. Pat. No. 5,417,052 describes a hybrid, combined cycle power plant driven by CRS and natural gas. The combined cycle is Brayton/Rankine. The CRS heat transfer fluid (HTF) is molten salt. The molten salt preheats the air leaving the gas cycle compressor. The exhaust gases from the gas cycle drive a steam cycle for additional energy production.

US 2008127647 discloses a method for oversizing the Rankine power block with respect to the topping cycle block in combined cycles where the bottoming cycle is Rankine. The method describes the production of the additional steam in the Rankine plant by solar energy. The method is applicable in plants that are equipped with an oversized heat recovery steam generator (HRSG) and steam turbine system that is coordinated with duct burners or other means for additional steam generation.

US 20060260314 discloses an integration between a combined cycle power plant and a solar Rankine power plant. Relatively high temperature, low pressure reheat from the combined cycle power generation system can be used, through, for example, a superheater, to raise the temperature and pressure of a working fluid in a solar Rankine power generation system. The resulting integrated system has enhanced efficiencies as compared with stand-alone systems.

Most of the solar thermal power today is produced by parabolic trough technology. Typically, parabolic trough plants consist of large fields of parabolic trough collectors, a heat transfer fluid/steam generation system, a Rankine steam turbine/generator cycle, and optional thermal storage and/or fossil-fired backup system(s). The solar field is modular in nature and comprises many parallel rows of single-axis-tracking parabolic trough solar collectors, normally aligned on north-south horizontal axis. Each solar collector has a parabolic shaped reflector that focuses the sun's direct beam radiation on a linear receiver located at the parabola focal axis. The collectors track the sun from east to west during the day. A heat transfer fluid (hereinafter "HTF") is heated up to about 400° C. while being circulated through the receiver and returns to a series of heat exchangers (hereinafter "HE") in the power block where the solar heat absorbed by the HTF (typically synthetic oil) is extracted to generate high pressure superheated steam (e.g. 100 bar, 371° C.). The superheated steam is then fed to a conventional reheat steam turbine/generator (condensing turbine) to produce electricity. The expanded steam from the turbine is condensed in a saturated condenser and returned to the HE via feed-water pumps to be transformed back into steam. Wet cooling towers or sea water supply cold water to the condenser. After passing through the power block, the cooled HTF is re-circulated through the solar field.

The parabolic trough approach is currently the most proven and lowest cost large-scale solar power technology available today as described by H. Price et al. in "Advances in Parabolic Trough Solar Power Technology", Journal of Solar Energy Engineering V. 124, Issue 2, pp. 109-125, May 2002. However, the cost of parabolic trough power is not yet competitive with conventional alternatives unless subsidized (typical installation cost for 50 MW plants is in the range of 4-6 $/W). One of the reasons is that the standard condensing steam power block described above has several drawbacks that highly limit the overall plant cost effectiveness and deployment. Some of these drawbacks are the following:

1) Water Cooled Condenser:

The condensers in steam power units are typically water cooled type where the water are typically cooled by a wet cooling tower (WCT). Air cooled condensers (dry cooling towers—DCT) are inferior because they increase the steam condensation temperature, and the steam condensing cycle efficiency is very sensitive to that temperature. In addition, DCT are more expensive than WCT. Consequently, solar thermal power plants are installed mostly in locations where water is available, rather than in desert and arid areas where solar radiation levels are typically the highest.

2) Condensing Turbine:

Condensing steam turbines for solar plants, typically designed to generate 50-80 MW, have a very unique design which creates low market availability (up to two years of manufacturing lead time). This might introduce a significant bottleneck to projects time tables because the other components lead times are substantially lower (typically less than one year). Another downside of the condensing turbine is the performance penalty when scaling down. For instance, the difference between 60 MW and 5 MW turbine shaft (isentropic) efficiencies is about 6%. The performance penalty increase both the specific required collection area ($m^2/W$) and the electricity specific cost ($/W). This is critical because the small and medium size plants (5-20 MW) market is currently growing rapidly.

3) Operation Time (Capacity Factor):

During day time, the solar radiation intensity varies. In a clear sky day, the radiation level increases gradually during the morning and reaches maximal level around noon while from afternoon to sunset, the insolation declines. In a standard (condensing turbine) power block, steam is fed into the turbine only when reaching a certain desired temperature, typically around 370° C. and an initial flow rate. Operating the turbine with substantially lower steam temperatures is eluded because that would expose the turbine blades to high levels of moisture which is destructive. Therefore, the standard routine in such a solar plant would be to wait until the heat transfer fluid heats up to about 390° C. so the desired steam top temperature can be achieved. However, this oil temperature can be obtained only when reaching a minimum insolation level, say 400 $W/m^2$. Thus, during early mornings and late afternoons' periods the solar plant cannot produce power. The result is shorter plant operation time (or lower capacity factor) and of course, higher electricity cost.

4) Working Fluid:

Steam condensation increases the power block complexity and cost due to the following two reasons:

a) The saturated steam specific volume is very high (for example, 12 $m^3/kg$ at 50° C.), requiring large size condensing unit.

b) The saturated pressure of steam at typical condensing temperatures is much below atmospheric (for instance, at 35° C. the pressure is 0.056 bar). Consequently, the condenser must always be maintained under deep vacuum and free of oxygen. Addressing these constrains, increases the plant O&M costs.

Other power cycles are also described in the literature.

For example, A. I. Kalina in "Combined-cycle system with novel bottoming cycle", Journal of Engineering for Gas Turbines and Power v. 106, pp. 737-741 (1984) describe a thermodynamic cycle that is designed to replace the Rankine cycle as a bottoming cycle for a combined-cycle energy system as well as for generating electricity by using low-temperature heat sources.

P. A. Lobos and E. D. Rogdakis described in their publication "A Kalina power cycle driven by renewable energy sources", Energy, Jan. 31, 2009, a Kalina cycle using low-temperature heat sources to produce power. The main heat source of the cycle is provided by flat solar collectors. In addition, an external heat source is connected to the cycle, providing 5% up to 10% of the total thermal energy used in the cycle. The cycle operates at low pressure levels (0.2-4.5 bar) and low maximum temperature (130° C.). For given conditions, an optimum range of vapor mass fractions and operating pressures can be identified that result in optimum cycle performance. Simple equations have been derived that link the operational parameters with the independent variables as well as with the cycle efficiency.

The present invention seeks to provide a solution that eliminates the major part of the above problems while increasing the solar plant efficiency.

SUMMARY OF THE INVENTION

It is an object of the present invention to provide a system for use in concentrated solar thermal power plants.

It is another object of the present invention to provide a system comprising a combined cycle for the power generation, wherein a top cycle is operative at a range of between high and intermediate temperatures, while a bottoming cycle is operative between intermediate and ambient temperatures.

Other objects of the invention will become apparent as the description of the invention proceeds. According to a first embodiment of the present invention there is provided a system for converting thermal energy derived from a solar radiation collecting field into electricity and wherein the system is adapted to operate in accordance with at least two modes of operation, depending upon the thermal energy intake from the solar field. The system comprising:

a first power generation sub-system (topping) comprising means to heat and convert water into superheated steam by exchanging heat with a first heat transfer fluid (e.g. oil) being heated at the solar radiation collecting field, the steam being the working fluid in a back pressure turbine for producing electricity;

a second power generation sub-system (bottoming) comprising means to heat a second working fluid up to the required operating conditions (e.g. to saturated or superheated conditions), and wherein the second working fluid is used to operate a second turbine for producing electricity;

and wherein the system is characterized in that when the thermal energy received at the first power generation sub-system exceeds a predetermined threshold of a selected criterion, both power generation sub-systems are operative to produce electricity and at least part of the heat required to heat said second working fluid is derived from steam being produced at said first power generation sub-system, whereas when the thermal energy received at the first power generation sub-system does not exceed that pre-defined threshold, the thermal energy conveyed by the first heat transfer fluid is used essentially to heat the second working fluid and electricity is generated only at the second power generation sub-system.

As will be appreciated by those skilled in the art, the exhaust steam derived from the back pressure turbine in the topping sub-system is preferably used as a second heat transfer fluid to heat the second working fluid. Although, it could be that the energy content of this exhaust steam is such that additional source of heat would be required in order to provide the necessary operating conditions for the second working fluid to be used in the turbine of the second power generation sub-system.

According to an embodiment of the invention, the solar field comprises a plurality of solar reflectors being a member of the group consisting of: parabolic trough reflectors, heliostats, linear Fresnel reflectors and parabolic dish(es), or any combination thereof. Preferably the solar reflectors are parabolic shaped solar tracking reflectors operative to concentrate incident solar radiation onto receivers, each extending along a respective parabolic trough's focal line In accordance with another embodiment of the invention, when the thermal energy conveyed by the first heat transfer fluid exceeds that predetermined threshold (i.e. when both power generation sub-systems are operative), more than half of the total electricity production of the system (preferably between ⅔ to ¾) is carried out by the first power generation block.

By yet another embodiment of the invention, the second power generation sub-system comprises an air-cooled condenser.

In accordance with still another preferred embodiment of the invention, the second working fluid is either inorganic or organic fluid. More preferably, the second working fluid is an ammonia-$H_2O$ mixture.

According to yet another preferred embodiment of the present invention, the selected criterion is a member of the group consisting of: temperature of the first heat transfer fluid leaving the solar radiation collecting field, rate of the first heat transfer fluid leaving the solar radiation collecting field, incident solar radiation, type of the HTF and the like, and any combination thereof.

Furthermore, as will be appreciated by those skilled in the art, although the options described in this embodiment for the selected criterion relate mainly to the characteristics of the first heat transfer fluid leaving the solar field, still there could be ways to set an equivalent criterion based on other parameters, e.g. rate of production of the superheated steam, which, if not high enough to run efficiently the turbine of the first power generation sub-system, could be used as exhaust steam to heat the second working fluid.

By still another preferred embodiment of the invention, the system provided further comprising a storage means adapted to store at least part of the energy collected at the solar radiation collecting field from the incident solar radiation, and wherein the storage means is further adapted to enable the discharge of stored energy for the production of electricity by one or both of said power generation sub-systems. Thermal energy received from the solar radiation collecting field may be stored as sensible heat, in phase changing material(s), in materials undergoing chemical reaction (preferably reversible chemical reaction), or in any form known in the art per se.

The first heat transfer fluid should be able to absorb the solar radiation at the operating temperature. It may be thermal oil or molten salt that absorbs the solar energy by heating up. In the alternative, it may be a phase changing fluid such as water/steam system (i.e. Direct Steam Generation) where the solar energy preheats and evaporates the liquid directly, and the like.

DETAILED DESCRIPTION OF THE INVENTION

The present invention will be understood and appreciated more fully from the following detailed example taken in conjunction with the drawings.

Figure 1:
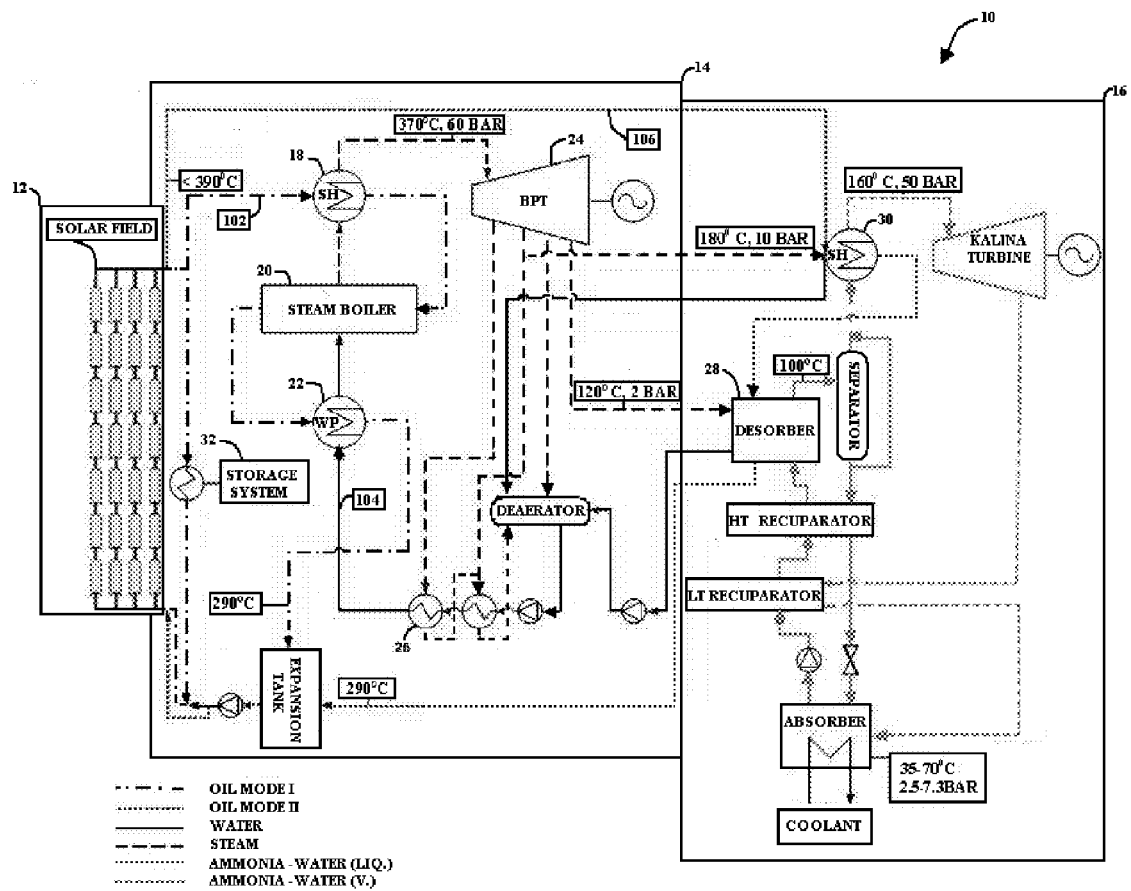
FIG. 1 presents a block diagram showing an example of a system incorporating a parabolic trough solar field with a combined cycle for power generation, according to an embodiment of the invention.

Let us consider now the example illustrated in the schematic block diagram of FIG. 1, of a system 10 designed to produce electricity from solar radiation by heating of a heat transfer media such as HTF apparatus according to an embodiment of the present invention. System 10 is a combined cycle system that comprises 3 major parts and is configured to operate in accordance with two modes of operation, depending upon the extractable thermal energy deriving from the solar source. The first part of the system, 12, is a solar field which is used for collecting solar energy and converting the collected solar energy into heat. According to this example, the solar field comprises a plurality of parabolic trough shaped collectors having pipes extending along their focal line, through which the heat transfer fluid, e.g. thermal oil, flows. The incident radiation heats up the outer surface of the pipes, which in turn heat the flowing HTF. The other two main parts of the system of this example are a power generation sub-system (based upon a Rankine cycle) 14 and a second, bottoming power generation sub-system (based upon a Kalina cycle) 16.

Following is the description of the two modes of operating the combined cycle (i.e. the combination of sub-system 14 and sub-system 16) for the production of electricity.

Mode I—High Insolation Conditions

During high level insolation conditions (typically >400 W/m$^2$), the first heat transfer fluid, e.g. thermal oil that has been heated while flowing through solar field 12 leaves the solar field (line 102) at about 400° C. and circulates through a series of heat exchangers which include steam superheater 18, steam boiler 20 and feed water preheater 22 in order to generate high pressure/temperature superheated steam out of feed water (line 104). The steam is fed to a back pressure turbine/generator (BPT) 24 to produce electricity (topping cycle). In the turbine, the steam expands and leaves at intermediate pressure/temperature. Some of the steam is used to heat feed water in a series of heat exchangers 26 whereas another part of the steam leaving the turbine/generator 24 is diverted to the second part of the combined cycle, the Kalina cycle 16. After condensing in the Kalina cycle desorber 28, the water is pumped to the feedwater heater 26 to be transformed back into the superheated steam along line 104. The Kalina cycle 16 is driven by two steam streams extracted from the BPT. Its superheater is driven by say 10 bar, 180° C. steam while the desorber is heated by say 2 bar, 120° C. steam (bottoming cycle).

In addition, some of the thermal energy derived from the solar field and conveyed by the heated HTF, may be diverted to a storage sub-system 32 for storage thereat, and be discharged at times where there is no solar radiation or not enough solar radiation to produce electricity.

The topping cycle (BPT) differs from the standard condensing steam cycle in two major elements: a back pressure turbine replaces the condensing turbine and the water cooled condenser is not required.

Mode II—Low Insolation Conditions

During low level insolation (typically at the range of 200÷400 W/m$^2$), or when some of the collectors are non-operative (e.g. due to maintenance operation), a high pressure/temperature steam cannot be generated and therefore the topping cycle i.e. the Rankine cycle is bypassed. Under such conditions, the first HTF, e.g. the oil (shown in line 106) still reaches temperature that exceeds 300° C. Therefore, in this mode, the oil is fed directly to the Kalina cycle 16 (the bottoming cycle) to provide the heat required in the desorber 28 and the ammonia superheater 30. The rest of the Kalina cycle 16 operates as known in the art per se. In the Kalina cycle a concentrated liquid ammonia-water solution (i.e. high ammonia content) leaves the absorber and pumped through a series of recuperators to a desorber. In the desorber, the solution is heated and partially boiled before it is fed into a liquid/vapor separator. Two streams leave the separator: weak (i.e. low concentration) liquid solution and highly concentrated ammonia-steam vapor. The weak solution is fed back into the absorber through the recuperators. The vapor is superheated and than fed to a turbine/generator (typically similar to the back pressure turbine) to produce electricity. The expanded vapor from the turbine is condensed in the absorber. The absorber is in fact the combined cycle condenser. As will be appreciated by those skilled in the art, the operation under this mode II, may further include incorporating a storage means, preferably one that is adapted to discharge heat at the appropriate temperature for use to heat the second working fluid prior to using it in the turbine/generator of cycle 16. This option enables the use of the Kalina cycle during times when there is no solar radiation available (e.g. during night times).

Some of the advantages of the proposed arrangement of the present invention are in the removal or alleviation of various cost effectiveness and deployment limitations that are typical to the use of a standard power block, these are:

(i). Condenser:

In the combined cycle (i.e. cycles 14+16) only the Kalina plant exchanges heat with the environment. Because the Kalina plant produces only part of the total combined cycle production (say, 33%), the Kalina condenser (or in other words the only condenser for this combined cycle configuration) is smaller in size than that of a condenser that would be installed in a Rankine cycle which provides the same electricity output as that of the combined cycle. Additionally, the (combined) cycle performance sensitivity to ambient (coolant) conditions is lower. Combining these facts together with the advantage of the working fluid (as explained in iv below), leads to the results that in the proposed combined cycle plant, either water or air cooled condensers can be considered.

(ii). Turbine/s:

Small and medium scale back pressure steam turbines are more efficient than condensing turbines. At 5 MW, the difference is 3% while at 20 MW the difference is about 1%. The supply lead time of the back-pressure and Kalina turbines are much shorter when compared with the condensing turbine (couple of months instead of two years), which is another factor that should be considered when starting to design such a system. Also, the back-pressure turbines are less expensive than the condensing turbines because they include fewer number of extraction/expansion stages, a fact that simplifies the design.

(iii). Operation Time:

Due to Mode II operation the system is capable of producing electrical power from solar radiation collected during early morning and late afternoon periods. This fact increases substantially the number of operational hours per year and the plant capacity factor.

(iv). Working Fluid/s

Due to the high content of ammonia in the vapor mixture (70-95%), the condensing pressure is super-atmospheric (>1 bar). The vacuum requirement for the condenser and absorber is therefore eliminated and the O&M costs are reduced. The ammonia saturated vapor specific volume is lower than the steam specific volume by about two orders of magnitude (0.0634 m$^3$/kg at 50° C.), allowing much smaller condensing unit.

The installation costs ($/W) of the combined cycle of the present invention are lower when compared to the standard cycle mainly because back pressure turbines are less expensive than the condensing turbines.

The novel power cycle thermal efficiency (heat to power) exceeds the efficiency of the condensing steam cycle because the bottoming, Kalina cycle, is a binary fluid cycle. In contrast to a single fluid cycle (such as steam), in a binary fluid cycle, the fluid (mixture) temperature is rising during the boiling process. This helps to maintain a relatively small temperature difference between the heat source and the working fluid, resulting in higher performance. Due to the increased power cycle performance and operation time, the overall, annual solar to power efficiency (or the amount of kWh$_e$/m$^2$·yr delivered) is higher compared to a standard plant.

Figure 2:
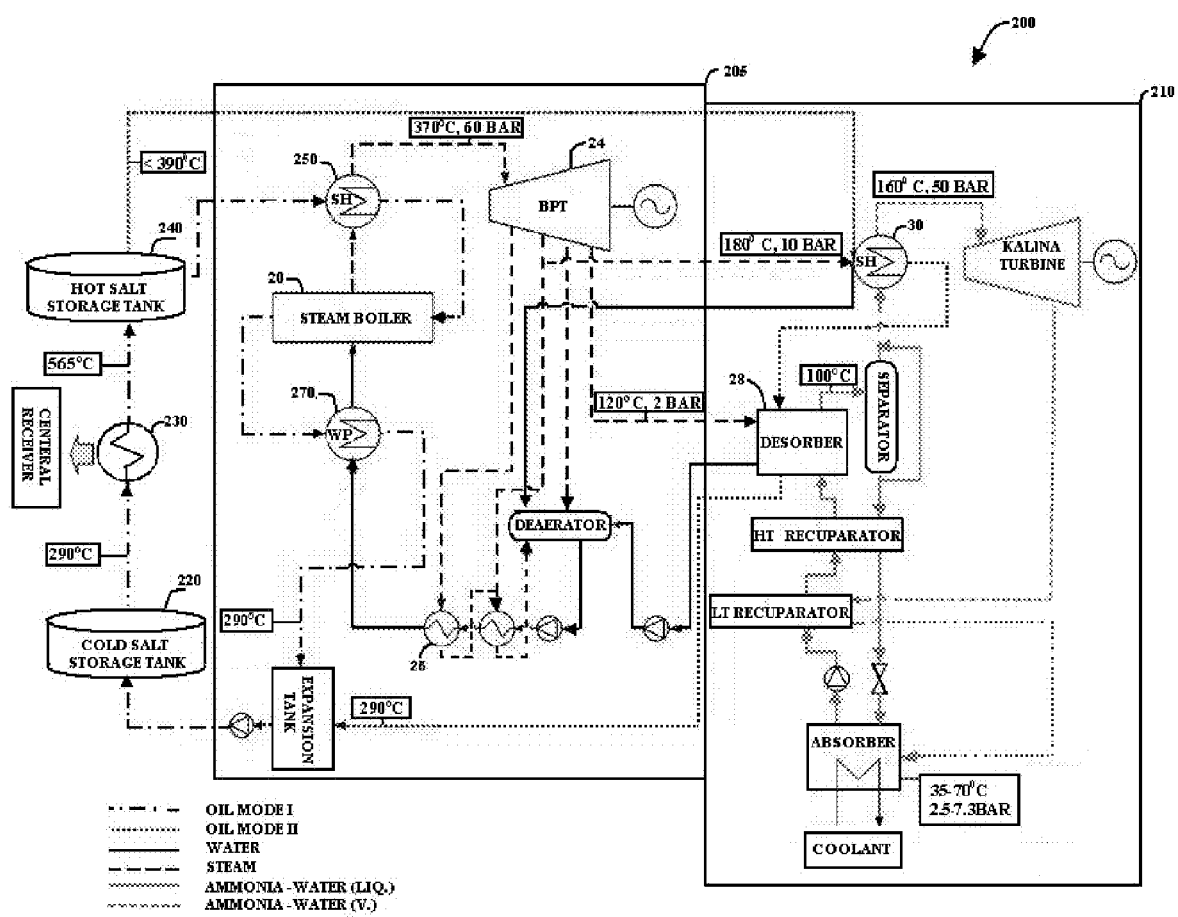
FIG. 2 illustrates a block diagram showing another example of a system incorporating a central receiver solar field with a combined cycle for power generation, according to an embodiment of the invention.

Let us now consider another example as illustrated in FIG. 2. By this example, the proposed combined cycle 200 is implemented in another CSP type of system, molten salt power tower. Typical temperatures/pressures for this arrangement are indicated in this Figure. Liquid salt at 290° C. is pumped from a "cold" storage tank 220 through the receiver 230 where it is heated to 565° C. and then on to a "hot" tank 240 for storage. When power is to be generated at the plant, hot salt is pumped from storage 240 to a steam superheater 250 to produce superheated steam for the combined Rankine 205/Kalina 210 power blocks. From the feedwater preheater 270, the salt is returned to the cold tank 220 where it is stored and eventually reheated in the receiver 230. If the combined cycle were driven by parabolic trough field, because of the fact that the superheated steam temperature would have been only 370° C., the inlet BPT pressure should have been limited to 60 bars in order to avoid high presence of moisture at the turbine exit (as illustrated in FIG. 1). However, in power towers, the superheated steam temperature is much higher (about 540° C.) and this limitation is not required. In other words, for the present example a 100 bar turbine inlet pressure could be applied without any moisture damage. As a result, the performance advantage of the combined cycle over the condensing steam cycle in this case is even greater. Similarly, the proposed combined cycle is suitable for other CSP plants such as linear Fresnel reflector and Dish/Engine systems.

Figure 3:
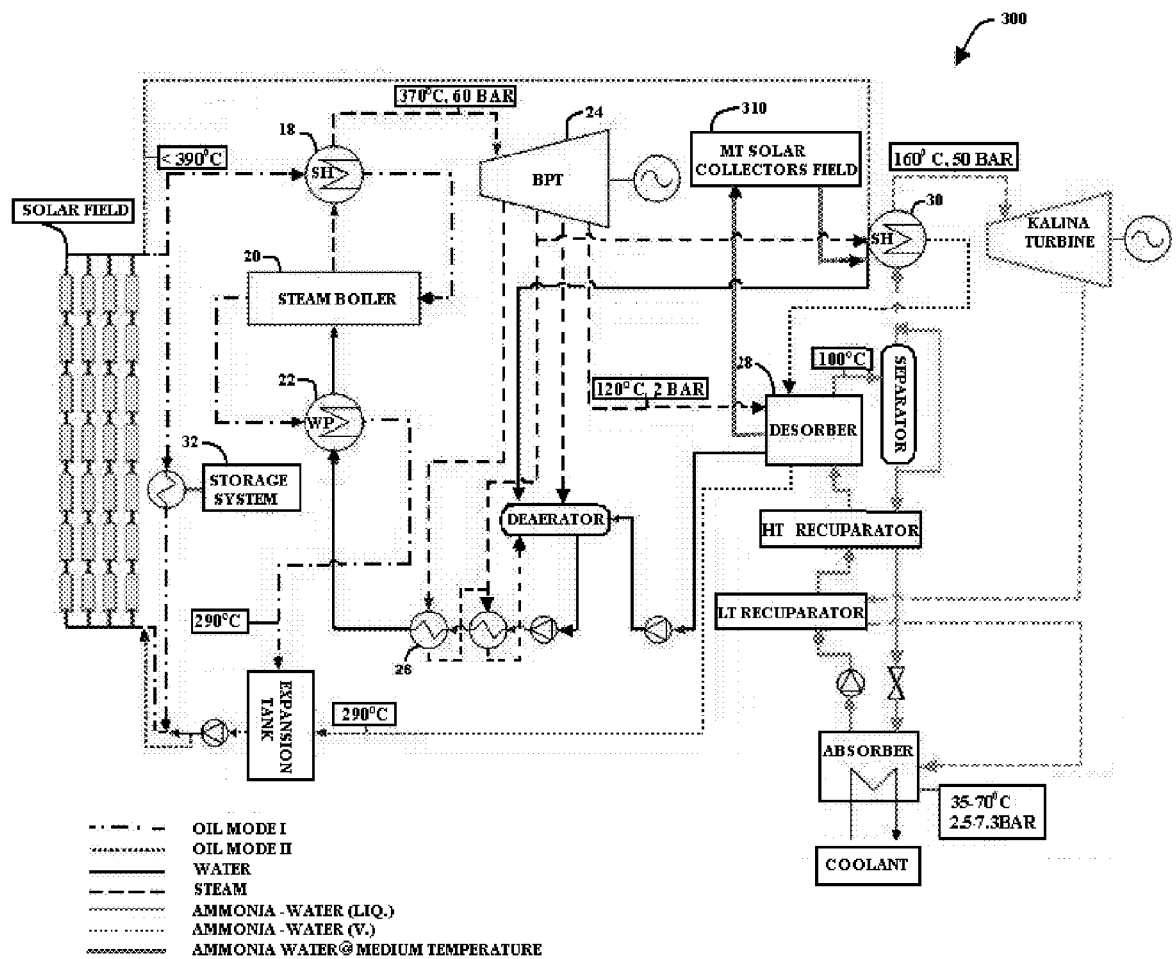
FIG. 3 presents a block diagram showing yet another example of a system incorporating a parabolic trough solar field with a combined cycle for power generation, where the bottoming cycle is driven by both the topping cycle and medium temperature solar collectors.

By another embodiment of the present invention, the system 300 may be scaled up by including a medium temperature solar collectors' field 310 (as illustrated in FIG. 3). The implementation of this embodiment can reduce the electricity production cost because the costs associated with medium temperature collectors are relatively low. In addition, it can operate the Kalina sub-system when medium temperature oil is required to heat the steam generators after periods of no direct beam insolation. Several commercial solar collectors for temperatures between 150° C. and 300° C. are available, such as: Compound parabolic concentrators (CPC), Linear Fresnel reflectors and medium temperature parabolic troughs such as IND 300 of Solel (designed to generate 300° C. oil).

It is to be understood that the above description only includes some embodiments of the invention and serves for its illustration. Numerous other ways of carrying out the methods provided by the present invention may be construed by a person skilled in the art without departing from the scope of the invention, and are thus encompassed by the present invention.

The invention claimed is:

1. A system for converting thermal energy derived from a solar field into electricity and wherein said system is adapted to operate in accordance with at least two modes of operation, depending upon the thermal energy intake, and wherein said system comprising:

a first power generation sub-system comprising means to heat water into superheated steam by exchanging heat with a first heat transfer fluid being heated at said solar radiation collecting field, and a back pressure turbine for producing electricity;

a second power generation sub-system comprising means to heat a second working fluid, and wherein said second working fluid is used to operate a second turbine for producing electricity;

and wherein said system is characterized in that when the thermal energy received at said first power generation sub-system exceeds a predetermined threshold of a selected criterion, both power generation sub-systems are operative to produce electricity and at least part of the heat required to heat said second working fluid is derived from steam derived from said first power generation sub-system, whereas when the thermal energy received at said first power generation sub-system does not exceed said threshold, the thermal energy conveyed by said first heat transfer fluid is used essentially to heat said second working fluid and the electricity is generated only by said second power generation sub-system.

2. A system according to claim 1, wherein said solar field comprises a plurality of heliostats or parabolic trough shaped solar tracking reflectors operative to concentrate incident solar radiation onto receivers each extending along a respective parabolic trough's focal line.

3. A system according to claim 1, wherein when the thermal energy conveyed by said first heat transfer fluid exceeds said predetermined threshold, more than half of the total electricity production of the system is carried out by the first power generation block.

4. A system according to claim 1, wherein said second power generation sub-system comprises an air-cooled condenser.

5. A system according to claim 1, wherein said second working fluid is an ammonia-$H_2O$ mixture.

6. A system according to claim 1, wherein said selected criterion is a member of the group consisting of: temperature of the heat transfer fluid leaving the solar field, rate of the heat transfer fluid leaving the solar field, incident solar radiation, type of the HTF and any combination thereof.

7. A system according to claim 1, further comprising a storage means adapted to store at least part of the energy collected at the solar radiation collecting field from the incident solar radiation, and wherein said storage means is further adapted to enable the discharge of stored energy for the production of electricity by one or both of said power generation sub-systems.

* * * * *